(12) United States Patent
Iwashige

(10) Patent No.: US 6,261,417 B1
(45) Date of Patent: *Jul. 17, 2001

(54) DEHYDRATING CONCENTRATOR

(75) Inventor: Naoyuki Iwashige, Kooriyama (JP)

(73) Assignees: Ishikawajima-Harima Jukogyo Kabushiki Kaisha; Ishikawajima Sangyo Kikai Kabushiki Kaisha, both of Tokyo-to (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/238,642

(22) Filed: Jan. 28, 1999

(30) Foreign Application Priority Data

Feb. 3, 1998 (JP) .................................................. 10-022009

(51) Int. Cl.⁷ ................................ D21D 1/00; D21C 7/00; B01D 33/00; B07B 1/24; B07B 3/00
(52) U.S. Cl. .......................... 162/261; 162/251; 210/396; 210/403; 210/374; 210/377; 209/296; 68/181 R; 68/182
(58) Field of Search ..................................... 210/396, 405, 210/403, 374, 377, 380.3; 209/296; 68/181 R, 182; 162/55, 57, 58, 251, 261; 198/676; 494/54, 55

(56) References Cited

U.S. PATENT DOCUMENTS

| | | |
|---|---|---|
| 2,943,800 | 7/1960 | Wultsch . |
| 3,585,924 * | 6/1971 | Nolan ........................................ 100/43 |
| 3,970,548 * | 7/1976 | Seifert et al. ........................... 209/240 |
| 4,518,621 * | 5/1985 | Alexander .............................. 426/495 |
| 4,528,098 * | 7/1985 | Treyssac et al. ....................... 210/414 |
| 4,826,608 * | 5/1989 | Kopper ................................... 210/781 |
| 5,435,917 * | 7/1995 | Sato ........................................ 210/374 |

FOREIGN PATENT DOCUMENTS

| | | |
|---|---|---|
| 197 17 448 | 10/1997 | (DE) . |
| 0 444 976 | 9/1991 | (EP) . |
| 1116849 | 6/1968 | (GB) . |
| 1-321986 | 12/1989 | (JP) . |
| WO 90/12919 | 11/1990 | (WO) . |
| WO 97/04165 | 2/1997 | (WO) . |

* cited by examiner

*Primary Examiner*—Stanley S. Silverman
*Assistant Examiner*—Dionne A. Walls
(74) *Attorney, Agent, or Firm*—Oblon, Spivak, McClelland, Maier & Neustadt, P.C.

(57) ABSTRACT

A strainer with a screen at its outer periphery is rotatably supported on a casing. A hollow pipe with paddles on an outer periphery of the pipe is fitted in the strainer. The hollow pipe is rotated at a rotating velocity different from that of the strainer. Slurry introduced into the hollow pipe is discharged through slurry outlets on the hollow pipe into inside of the strainer. Then, the slurry is hydrated by the screen under centrifugal action and is moved by the paddles toward a slurry outlet.

11 Claims, 3 Drawing Sheets

DEHYDRATING CONCENTRATOR

BACKGROUND OF THE INVENTION

1. Field of the Invention

The present invention relates to a dehydrating concentrator for separating waste paper pulp slurry or other industrial waste slurry into moisture and solid components or into moisture components and concentrated stock.

2. Description of the Related Art

In paper pulp industry, pulp stock with low concentration is often concentrated to have higher concentration. When paper pulp stock is to be concentrated to a concentration of for example 30% (moisture content 70%) or more by a screw thickener, stock to be processed must be set to have a concentration of for example 2.5% or more so that stock suspension has lower fluidity. This is because paper pulp stock in general has a strong water-retaining property and requires high pressure applied so as to be concentrated to a concentration of for example 30% or more. Application of high pressure to the suspension of stock to be processed and having high fluidity would fail since such stock suspension with high fluidity might escape even through a minute gap.

On the other hand, even a strainer with larger pores can apply high pressure to stock suspension and readily concentrate it into a higher concentration provided that the stock suspension to be processed is pre-concentrated to have low fluidity since pulp fibers can form a very dense and compact mat by itself on the surface of the strainer. Several types of apparatuses including a screw thickener as described above are known as systems utilizing this principle.

As a dehydrating concentrator utilizing centrifugal force, a centrifugal separator is known. This is an apparatus which applies high centrifugal force on a suspension containing solid components to remove moisture or water components through a strainer. The resultant dehydrated stock is discharged by a screw which scrapes off the stock on an inner surface of the strainer.

In the case of the screw thickener mentioned above, sufficient dehydration cannot be attained unless stock to be processed has a concentration of for example 2.5% or more. Moreover, solid components tend to admix in the stock solution after squeezing since the strainer cannot be made to have pores with a diameter smaller than a predetermined value (e.g., 2 mm in diameter). In the case of the centrifugal separator, a drive for the separator must be sturdy in structure since sufficient dehydration effect cannot be attained unless the centrifugal force applied to the stock is 1000 G or more. Moreover, during hydration, fibers of pulp stock tend to be entangled with each other into a thick stock mat which may be rotated together with the screw, resulting in failure of smooth discharge of the dehydrated stock.

BRIEF SUMMARY OF THE INVENTION

It is an object of the present invention to provide a dehydrating concentrator which is compact in size and which can concentrate and dehydrate even stock of low concentration.

Embodiments of the invention will be described in conjunction with the attached drawings.

DETAILED DESCRIPTION OF THE PREFERRED EMBODIMENTS

Figure 1:
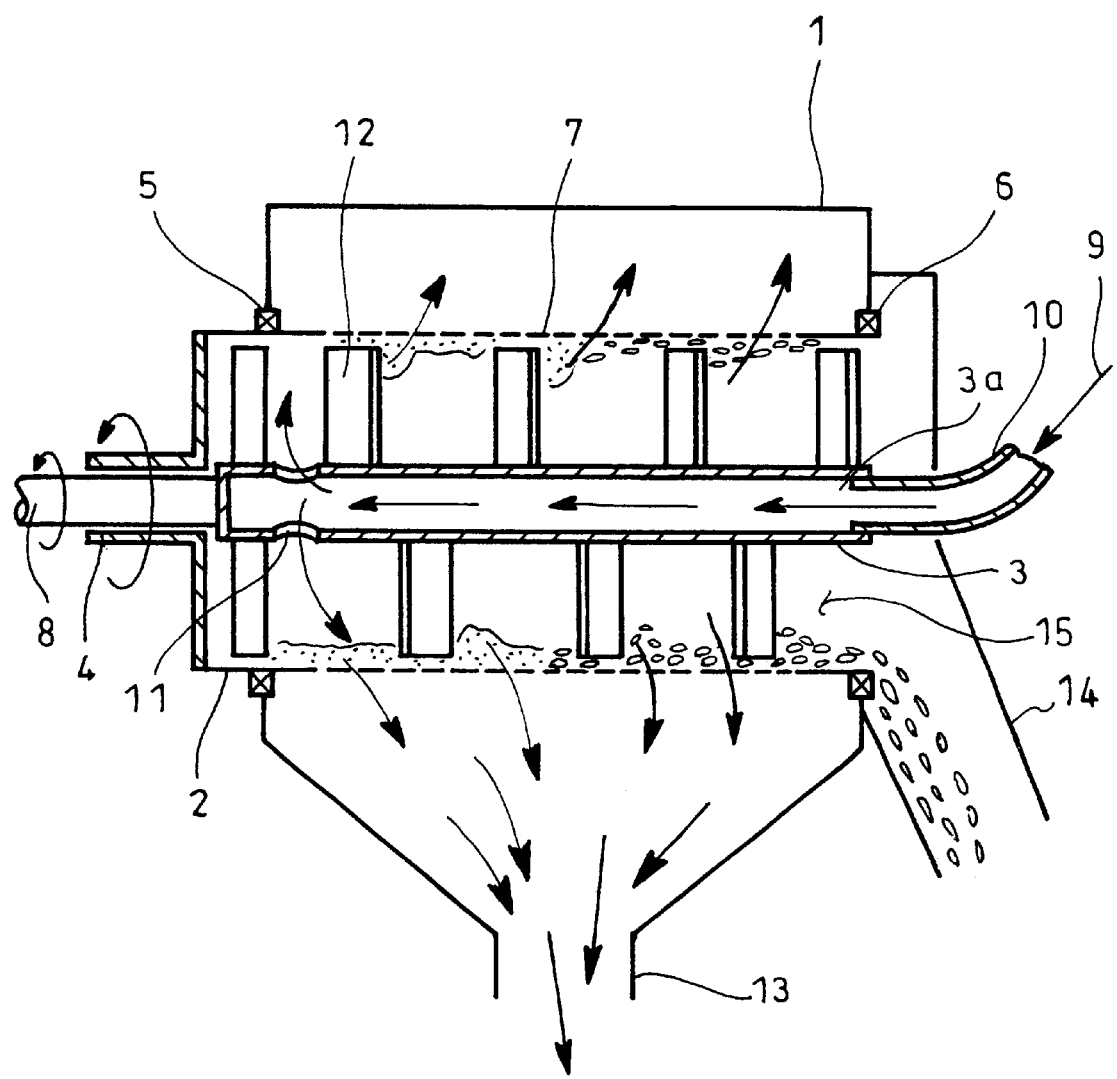
FIGS. 1, 2 and 3 schematically illustrate first, second and third embodiments of the invention, respectively.

FIG. 1 schematically illustrates a dehydrating separator according to a first embodiment of the invention which comprises a non rotatable casing 1, a hollow strainer 2 supported at two axial points and rotated in the casing 1 and a hollow pipe 3 longitudinally fitted in the strainer 2 and rotated at a velocity different from that of the strainer 2.

The strainer 2 has a closed end integral with a hollow outer shaft 4. The other end of the strainer 2 is open to provide an outlet 15. The strainer 2 is supported on the casing 1 by a bearing 5 near the closed end of the strainer 2 having the outer shaft 4 and by a bearing 6 on the open end of the strainer 2. The strainer 2 has at its outer periphery a screen 7 with pores or slits in such size as to suit properties of stock to be concentrated and/or quality of liquid after squeezing.

The hollow pipe 3 has a closed end adjacent to the closed end of the strainer 2 and integral with an inner shaft 8 which in turn extends through the outer shaft 4. The other end of the hollow pipe 3 is open to provide an opening 3a to which a slurry inlet 10 is concentric and rotatably connected for introduction of the slurry 9. The hollow pipe 3 further has slurry exits or outlets 11 adjacent to its closed end so as to discharge the slurry 9 outside into inside of the strainer 2. The hollow pipe 3 has a plurality of plate-like paddles 12 mounted on an outer periphery of the pipe 3 in, axially spaced apart relationship with each other and such that a gap of about 0.1–5.0 mm is provided between a tip of each of the paddles 12 and an inner surface of the screen 7. The paddles 12 are arranged to have tilt angles to the axis of the pipe 3 so as to move the dehydrated stock from the closed end of the hollow pipe 3 toward the outlet 15 (i.e., from left to right in FIG. 1).

Here, it is supposed that maximum tilt angle of the paddles 12 to the axis of the pipe 3 is 90 degrees where the paddles cannot move the stock at all. With respect to the slurry 9 just after its entry through the outlets 11 into inside of the strainer 2 and having high moisture content (i.e. in initial stage of dehydration process), the corresponding paddles 12 positioned near the closed end of the strainer 2 are arranged to have smaller or acute tilt angles to the axis of the pipe 3 so as to increase the moving velocity of the slurry 9 and to prevent any thick stock mat from being formed on the inner surface of the screen 7. With respect to the slurry 9 being moved toward the right in FIG. 1 (i.e. in late stage of the dehydration process), the corresponding paddles 12 are arranged to have tilt angles gradually increased closer to 90 degrees so that the moving velocity of the slurry 9 is gradually decreased with the decrease of moisture content. The paddles 12 serve to clean up the pores or slits of the screen 7 and to pulverize any sheet-like stock mat formed on the screen.

The casing 1 is integrally formed at its lower end with a tapered water discharge duct 13 so that water or moisture components produced as the result of dehydration through the screen 7, i.e., water components passing through the screen 7, are collected together and are discharged outside. The casing 1 is integrally formed with a stock outlet 14 which communicates with the outlet 15 so as to discharge solid matters or concentrated stock after dehydration.

Although not shown in the figure, the hollow pipe 3 and the inner shaft 8 are supported on the casing 1 or the strainer 2 by bearings.

Next, the mode of operation of the dehydrating concentrator shown in FIG. 1 will be described.

The slurry 9 to be dehydrated is introduced through the slurry inlet 10 into the hollow pipe 3 and is discharged through the slurry outlets 11 in the hollow pipe 3 into inside of the strainer 2 which is rotated via the outer shaft 4 by an external drive (not shown) to apply centrifugal force to the slurry 9. As a result, the slurry 9 is pressed against the inner surface of the screen 7 and is dehydrated.

The slurry 9 in the initial stage of the dehydration process has the highest water content. If moisture is removed quickly in this stage, fluidity of the slurry 9 might be lost, resulting in formation of a thick stock mat in a cylindrical shape on the screen 7. Such thick stock mat would rotate in unison with the paddles 12 along the inner surface of the screen 7, leading to failure of sufficient dehydration and of discharge of the stock mat. In order to overcome this problem, according to the invention, the stock mat is gradually scraped off into flakes and is fluidized by the tips of the paddles 12 before the mat is thickened.

More specifically, immediately after the slurry 9 is supplied through the slurry outlets 11 to inside of the strainer 2 (i.e. in the initial stage of the dehydration process), the slurry 9 has high moisture content and has fluidity to some extent. In this stage, the slurry 9 is quickly moved downstream by the paddles 12 with the decreased or smaller tilt angles so that the thick stock mat may not be formed on the inner surface of the strainer 2 and dehydration by centrifugal force can be performed to full extent.

With progress of the dehydration process, the slurry 9 is moved by the paddles 12 toward the outlet 15. In the late stage of dehydration process, moisture content of the slurry 9 is decreased and fluidity is also decreased. The sheet-like stock mat formed on the inner surface of the screen 7 is scraped off by the paddles 12 into flakes before the mat is thickened. Fragmentation into flakes will contribute to an increase of fluidity, resulting in an increase of movability. Tilt angles of the paddles 12 at a downstream side are gradually increased to slow down the moving velocity of the slurry. As a result, the flake-like solid matters are dehydrated to full extent and are discharged through the stock outlet 14.

Generally speaking, it is relatively easy to dehydrate the slurry 9 having higher moisture content to some extent whereas further dehydration of the slurry 9 which has been dehydrated to some extent is difficult to carry out. This problem is overcome by the invention. During an initial stage of dehydration, the slurry 9 is moved at relatively higher velocity by the paddles 12 installed at smaller tilt angles so that the thick stock mat is prevented from being formed. In the late stage of the dehydration process, the slurry 9 is slowly dehydrated while it is moved at a slower velocity by the paddles 12 installed at larger tilt angles and the sheet-like stock mat formed is scraped off by the paddles 12 into flakes and is fluidized. As a result, effective dehydration can be carried out over the entire area of the strainer 2.

The slurry 9 is thus dehydrated to be concentrated into solid material, and is discharged outside through the stock outlet 14. The moisture or water components obtained as a result of dehydration are discharged out through the moisture discharge duct 13.

When pulp slurry with low concentration and with high fluidity is to be concentrated to higher concentration (e.g., to solid matters at 30% concentration), a screw thickener is not suitable as described above and centrifugal force must be utilized. However, in this case, utilization of a conventional centrifugal separator would lead to larger-sized installation since such centrifugal separator can process relatively smaller quantity of liquid.

In contrast, according to the present invention, thin stock mat is formed on the inner surface of the screen 7 in the initial stage of dehydration and dehydration is effectively performed. Further, the stock mat is pulverized to flakes by the paddles 12 in the late stage of the dehydration process and is slowly moved. Thus, the dehydrated stock is not rotated in unison with the paddles 12 and is smoothly discharged. There is no need of decreasing the thickness of the entire stock mat. As a result, the dehydration efficiency per unit area of the strainer 2 can be increased, which contributes to make the apparatus compact in size. Also, the hollow pipe 3 serves to introduce the slurry 9 to be dehydrated into the strainer 2 and to rotate the paddles 12, which dual purpose contributes to simplification and further compaction in the size of the apparatus.

Figure 2:
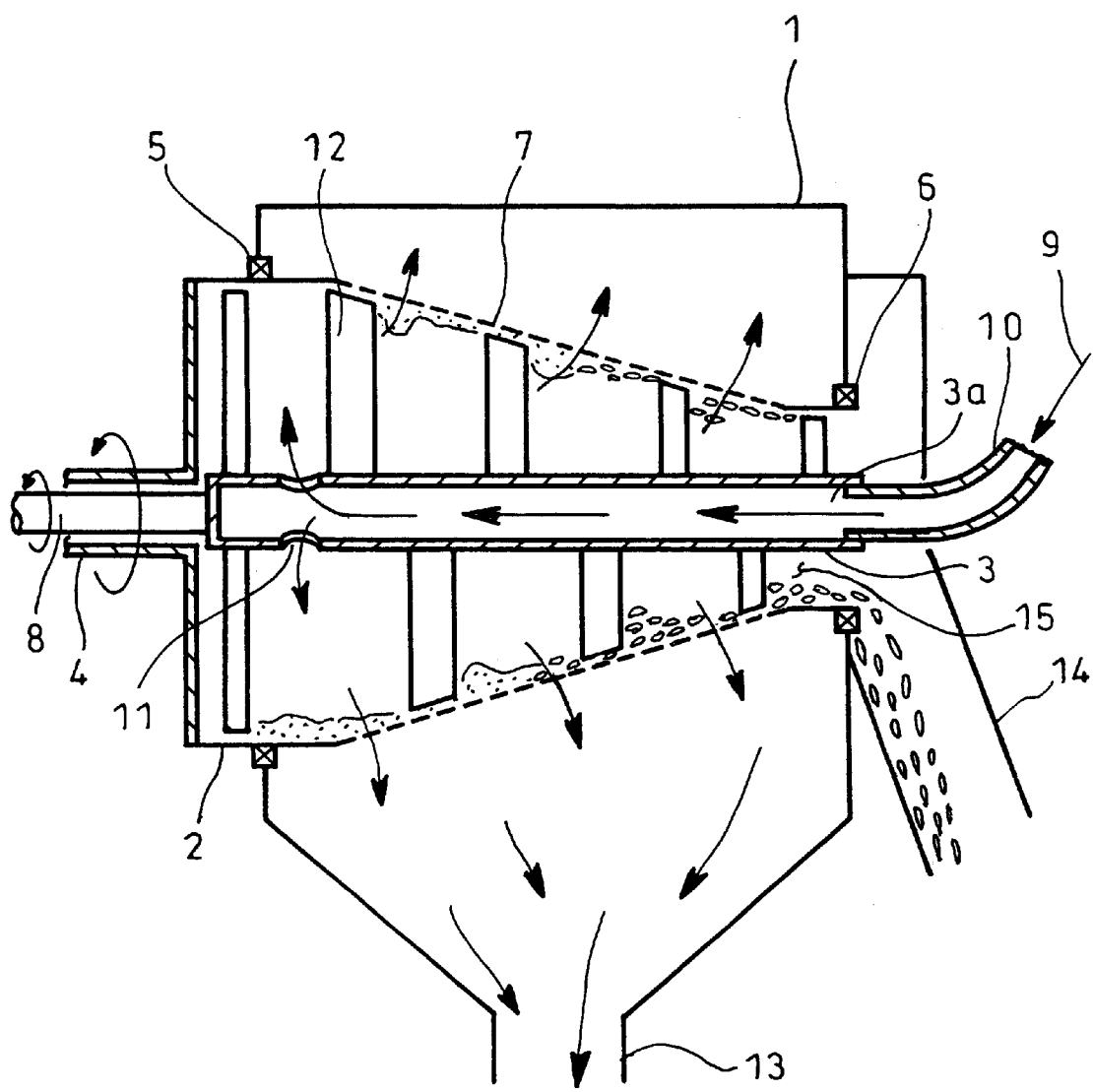

FIG. 2 schematically illustrates a hydrating concentrator according to a second embodiment of the invention which is substantially similar to that of the first embodiment shown in FIG. 1 except that the strainer 2 is frustoconical and converge toward the open end 15 (in the direction of movement of the stock) and that the paddles 12 are varied in length so as to cope with the shape of the strainer 2.

With the diameter of the strainer 2 being gradually reduced toward the outlet 15, the stock or the concentrated slurry 9 is more difficult to be discharged after dehydration. Compared with the first embodiment shown in FIG. 1, the slurry 9 tends to stay longer in the strainer 2, which ensures further positive dehydration. Therefore, this apparatus is suitable for efficient dehydration of the slurry 9 which is more difficult to dehydrate.

In this case, if the rotating velocity of the inner shaft 8 is made slower than that of the outer shaft 4, i.e., if the rotating velocity of the paddles 12 is made slower than that of the strainer 2, the slurry 9 can be moved by the paddles 12 with the dehydration by the rotating strainer 2 being enhanced to a maximum level.

Figure 3:
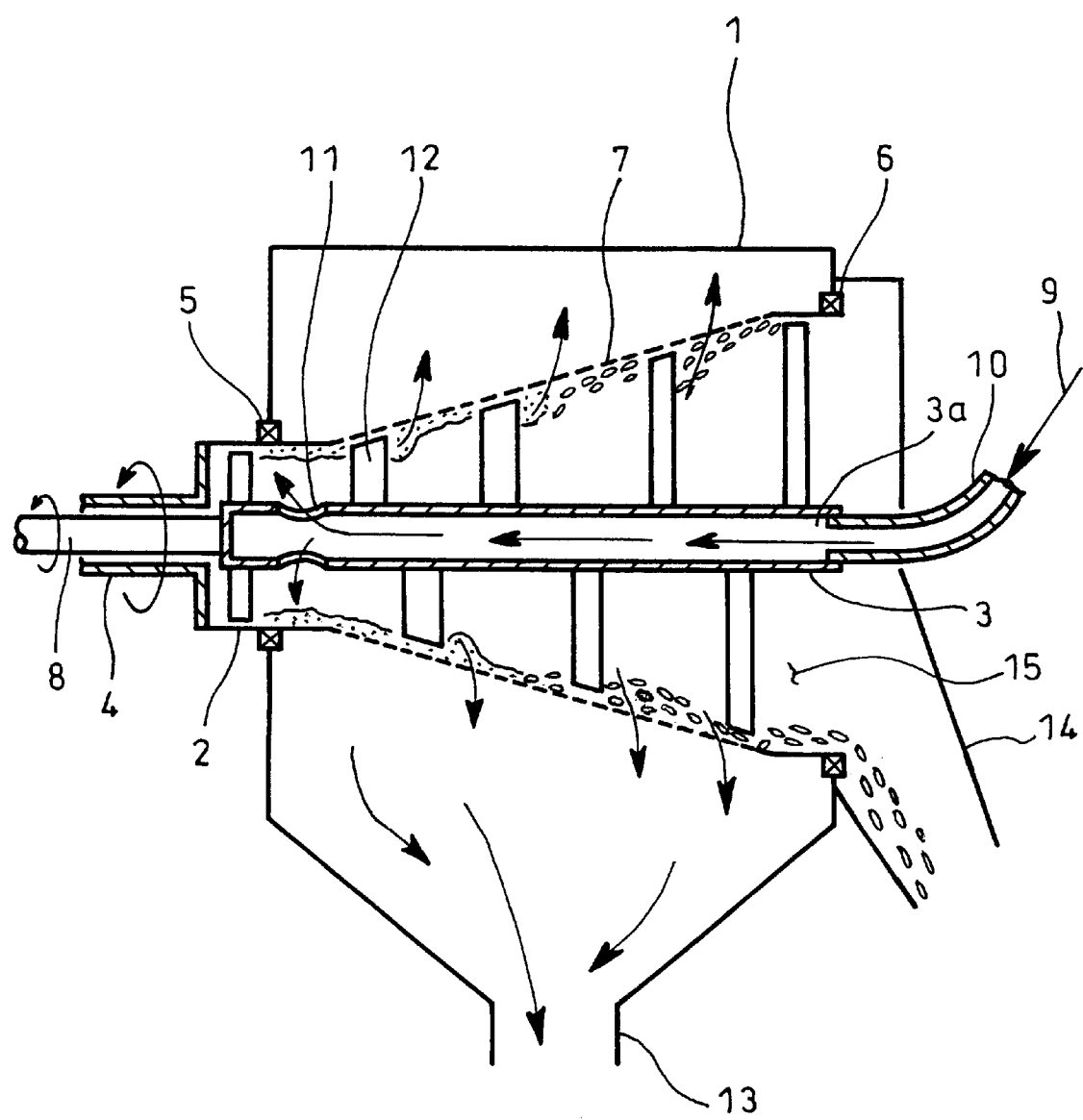

FIG. 3 schematically illustrates a dehydrating concentrator according to a third embodiment of the invention which has the frustoconical strainer 2 divergent toward the outlet 15 contrary to that of the second embodiment shown in FIG. 2. With the strainer 2 being of such a shape, the stock or the concentrated slurry 9 can be more easily discharged after dehydration. Therefore, this apparatus is suitable to quickly dehydrate the slurry 9 which can be easily dehydrated and to withdraw it within short time.

In this case, if the rotating velocity of the inner shaft 8 is made higher than that of the outer shaft 4, i.e., if the rotating velocity of the paddles 12 is made higher than that of the strainer 2, the moving velocity of the slurry 9 toward the outlet 15 is accelerated.

In any of the first, second and third embodiments as described above, the following effects can be attained:

(1) Stock with low concentration (e.g., concentration of less than 2.5%) may be concentrated and dehydrated to have a concentration of for example more than 30%.

(2) The screen 7 of the strainer 2 may be formed of smaller pores or slits, which smallness contributes to suppressing the solid matters from moving into the liquid components after squeezing of the slurry.

(3) Dehydration can be carried out in a stable manner even when the stock is not supplied in constant quantity.

(4) The apparatus is compact in size.

What is claimed is:

1. A dehydrating concentrator for waste paper stock, comprising:
   a casing;
   a hollow strainer rotatably supported inside the casing, said strainer having a closed end and an open end to provide an outlet for dehydrated stock;

a screen arranged on an outer periphery of the strainer; and a plurality of axially spaced, plate-shaped paddles rotatably supported inside the strainer at a rotating velocity different than a rotating velocity of the strainer, said paddles configured to move hydrated stock through the strainer for dehydration towards the outlet, and said paddles set at tilt angles such that a velocity of stock moving through the strainer is higher in an initial stage of the dehydration and lower in a late stage of the dehydration near the outlet.

2. A dehydrating concentrator according to claim 1, further comprising:

a rotatable hollow pipe on which the paddles are fixed in the strainer, said pipe having an inlet through which the stock to be dehydrated is introduced from outside of the strainer, and said pipe also having an exit positioned adjacent to the closed end of the strainer through which the stock to be dehydrated is fed into the strainer.

3. A dehydrating concentrator according to claim 1, wherein said casing is nonrotatable.

4. A dehydrating concentrator according to claim 1 or 2 wherein said strainer is cylindrical.

5. A dehydrating concentrator according to claim 1 or 2 wherein said strainer is frustoconical and convergent in a direction of movement of the stock.

6. A dehydrating concentrator according to claim 5, wherein said paddles are varied in length and conform in shape to the frustoconical and convergent strainer.

7. A dehydrating concentrator according to claim 1 or 2 wherein said strainer is frustoconical and divergent in a direction of movement of the stock.

8. A dehydrating concentrator according to claim 7, wherein said paddles are varied in length and conform in shape to the frustoconical and divergent strainer.

9. A dehydrating concentrator according to claim 2, further comprising:

a tapered water discharge duct formed at a lower end of the casing.

10. A dehydrating concentrator according to claim 2, wherein said inlet is concentric with the open end of the strainer.

11. A dehydrating concentrator for waste paper stock, comprising:

a nonrotatable outer casing;

a hollow strainer rotatably supported inside the casing, said strainer having an outlet for dehydrated stock at one end and being closed at an opposite end;

a screen arranged on an outer periphery of the strainer;

a rotatable hollow pipe fitted longitudinally through the casing and the strainer, said pipe having an inlet for hydrated stock concentric with the open outlet for the dehydrated stock and also having an inlet for hydrated stock adjacent to the closed opposite end of the strainer; and a plurality of axially spaced, plate-shaped paddles rotatable supported inside the strainer at a rotating velocity different than a rotating velocity of the strainer, said paddles configured to move the hydrated stock from the pipe exit adjacent to the closed opposite end through the strainer for dehydration to the open outlet for the dehydrated stock, wherein said paddles are set at tilt angles such that a velocity of the stock moving through the strainer for dehydration is higher in an initial stage of the dehydration at the closed opposite end of the strainer and lower in a late stage of the dehydration near to the open outlet of the strainer.

* * * * *